US011565646B2

(12) United States Patent
Odate

(10) Patent No.: US 11,565,646 B2
(45) Date of Patent: Jan. 31, 2023

(54) STEERING DEVICE AND VEHICLE

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/511,891

(22) Filed: Oct. 27, 2021

(65) Prior Publication Data

US 2022/0134990 A1 May 5, 2022

(30) Foreign Application Priority Data

Nov. 2, 2020 (JP) .............................. JP2020-183794

(51) Int. Cl.
*B60R 21/203* (2006.01)
*B60R 16/02* (2006.01)
*B60R 21/015* (2006.01)

(52) U.S. Cl.
CPC ........ *B60R 21/203* (2013.01); *B60R 16/0207* (2013.01); *B60R 21/01512* (2014.10)

(58) Field of Classification Search
CPC .......................... B60R 21/203; B60R 21/2035
See application file for complete search history.

(56) References Cited

FOREIGN PATENT DOCUMENTS

| JP | 2005246998 A | * | 9/2005 | |
|----|--------------|---|--------|---|
| JP | 2011-5976 A  |   | 1/2011 | |
| WO | WO-0187675 A2 | * | 11/2001 | ......... B60R 21/2035 |

* cited by examiner

*Primary Examiner* — Nicole T Verley
(74) *Attorney, Agent, or Firm* — WHDA, LLP

(57) ABSTRACT

An in-vehicle steering device, comprising a steering wheel, and an airbag mechanism that is built in the steering wheel and includes an airbag body deployable to a vehicle body rear side, wherein the steering device further comprises an in-vehicle component built in the steering wheel, and the in-vehicle component has a recessed groove portion for guiding the airbag body to be deployed when the airbag body is deployed in a front-rear direction of the vehicle body.

10 Claims, 6 Drawing Sheets

STEERING DEVICE AND VEHICLE

CROSS-REFERENCE TO RELATED APPLICATION(S)

This application claims priority to and the benefit of Japanese Patent Application No. 2020-183794, filed on Nov. 2, 2020, the entire disclosure of which is incorporated herein by reference

BACKGROUND OF THE INVENTION

Field of the Invention

The present invention mainly relates to an in-vehicle steering device.

Description of the Related Art

A steering device for steering a vehicle generally includes an airbag mechanism (see Japanese Patent Laid-Open No. 2011-5976). For example, when an impact is generated in a vehicle body, the airbag mechanism protects a driver from the impact by deploying an airbag body. Further contrivance is required in order to appropriately deploy the airbag body with a relatively simple configuration.

SUMMARY OF THE INVENTION

The present invention can appropriately deploy an airbag body with a relatively simple configuration.

One of the aspects of the present invention provides an in-vehicle steering device, comprising a steering wheel, and an airbag mechanism that is built in the steering wheel and includes an airbag body deployable to a vehicle body rear side, wherein the steering device further comprises an in-vehicle component built in the steering wheel, and the in-vehicle component has a recessed groove portion for guiding the airbag body to be deployed when the airbag body is deployed in a front-rear direction of the vehicle body.

Further features of the present invention will become apparent from the following description of exemplary embodiments with reference to the attached drawings.

DESCRIPTION OF THE EMBODIMENTS

Figure 1:
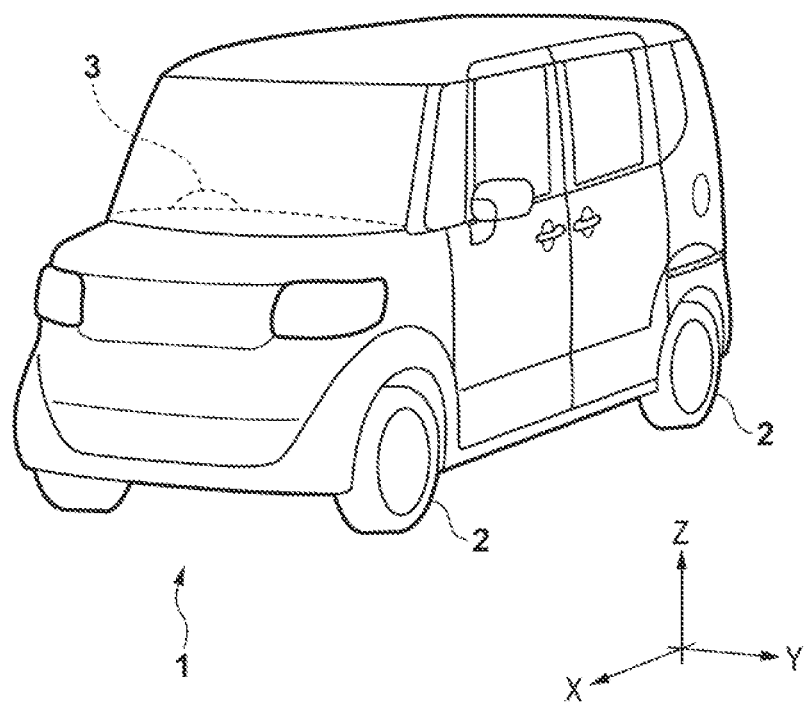
FIG. 1 is a schematic external view of a vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a perspective view of a structure of a vehicle 1 according to an embodiment. In the drawing, an X axis, a Y axis, and a Z axis orthogonal to each other are illustrated in order to facilitate understanding of the structure (the same applies to other drawings described later). The X direction corresponds to a front-rear direction of a vehicle body, the Y direction corresponds to a left-right direction of the vehicle body or a vehicle width direction, and the Z direction corresponds to a top-bottom direction of the vehicle body.

The vehicle 1 includes wheels 2. In the present embodiment, as one typical example, the vehicle 1 is a four-wheeled vehicle including a pair of left and right front wheels and a pair of left and right rear wheels, but the number of wheels is not limited to that in this example.

The vehicle 1 further includes a steering device 3. A driver can change a traveling direction of the vehicle 1 by operating the steering device 3, for example, by changing a direction of the front wheels.

Figure 2:
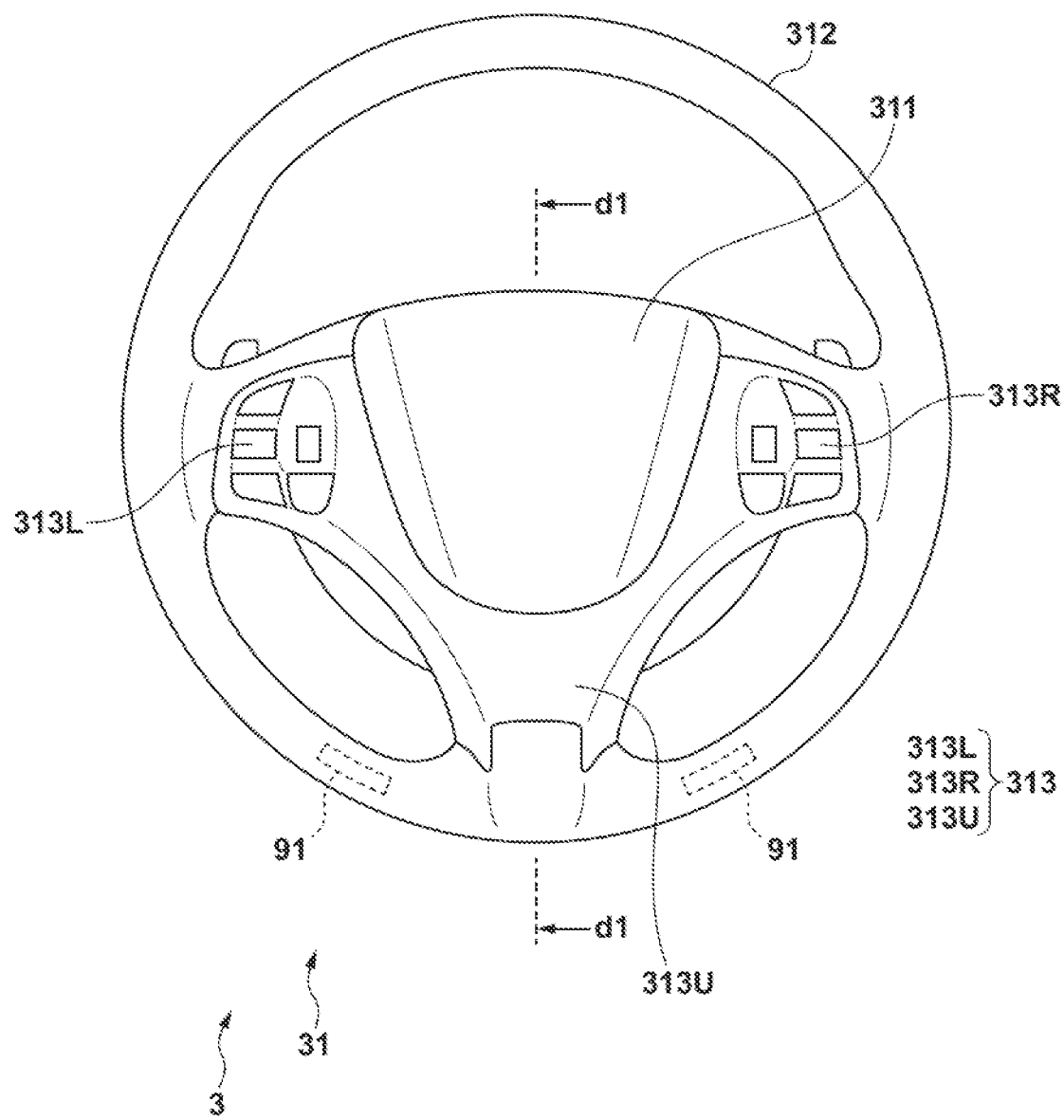
FIG. 2 is a schematic front view of a steering device.

FIG. 2 is a schematic front view of the steering device 3. As one typical example, the steering device 3 includes a steering wheel 31 including a hub portion 311, a rim portion 312, and a spoke portion 313. In the drawing, it is assumed that the steering wheel 31 indicates a posture that allows the vehicle 1 to travel straight, and the present embodiment will be described below on the premise of this.

The hub portion 311 is disposed at a central portion of the steering wheel 31, and a horn switch is disposed on a front side of the hub portion 311. The rim portion 312 is a peripheral edge portion for a driver to grip the steering wheel 31. The spoke portion 313 connects the hub portion 311 and the rim portion 312 to each other, and includes a left spoke portion 313L, a right spoke portion 313R, and a lower spoke portion 313U in the present embodiment.

Although details will be described later, a sensor unit 91 is built in the steering wheel 31, and the sensor unit 91 can detect grip of the rim portion 312 by a driver. The sensor unit 91 is typically built in the rim portion 312.

A switch case can be disposed on each of the left spoke portion 313L and the right spoke portion 313R. In the switch case, one or more switches capable of receiving a predetermined operation input (for example, an operation input for a volume and a channel of a car audio or an operation input for an air volume and a set temperature of an air conditioner) can be disposed.

Figure 3:
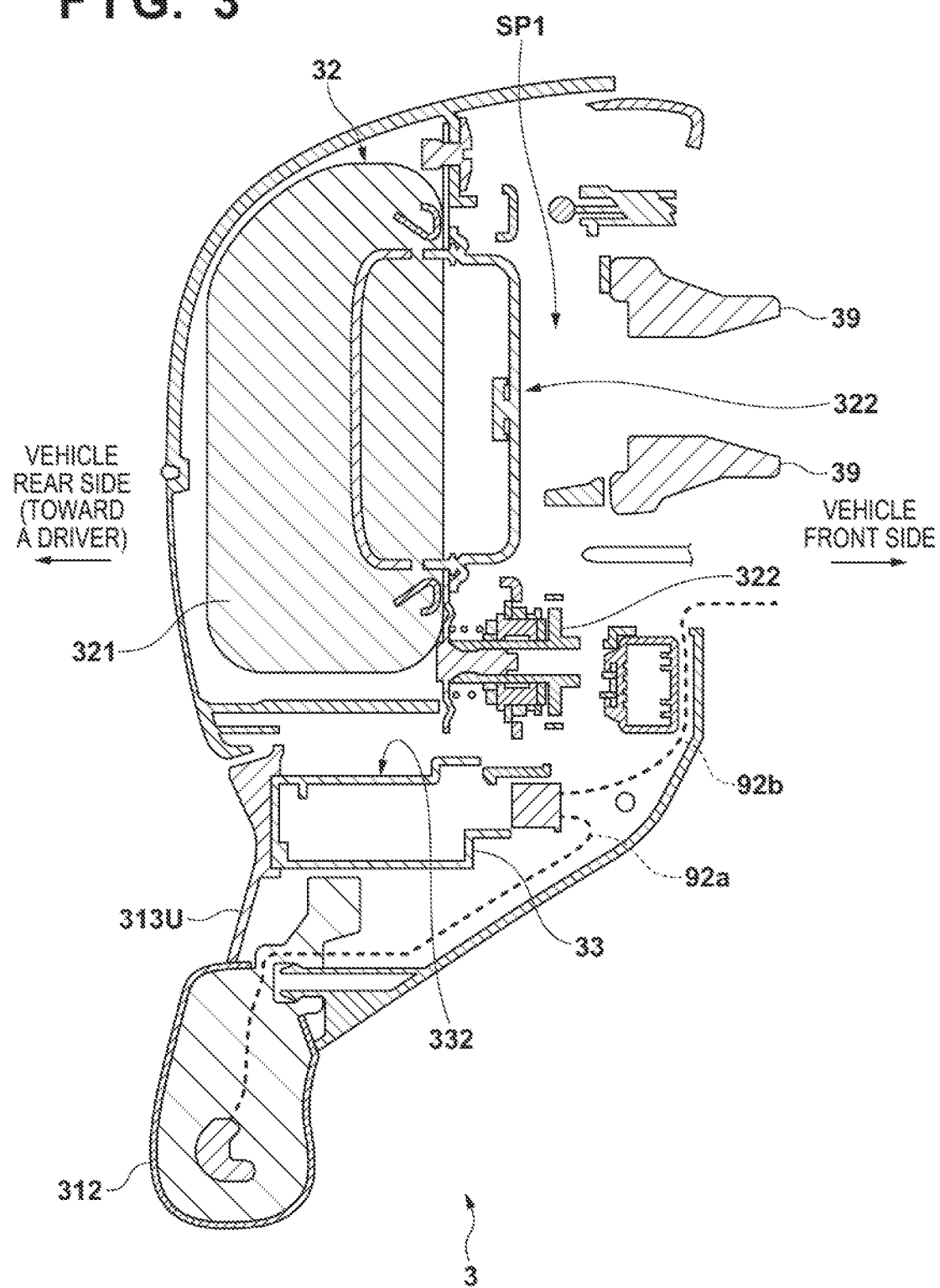
FIG. 3 is a schematic cross-sectional view of the steering device.

FIG. 3 is a schematic cross-sectional view of the steering device 3 indicated by a cutting line d1-d1 in FIG. 2. The steering device 3 further includes an airbag mechanism 32 and an in-vehicle component 33. These components are built in the steering wheel 31. In the present embodiment, in a front view of the steering wheel 31, the airbag mechanism 32 is disposed so as to overlap the hub portion 311, and the in-vehicle component 33 is disposed so as to overlap the spoke portion 313 (here, the lower spoke portion 313U). Note that the front view of the steering wheel 31 corresponds to a viewpoint when the steering wheel 31 is viewed in a direction parallel to a rotating shaft of the steering wheel 31.

The airbag mechanism 32 includes an airbag body 321 and an inflator 322. The airbag body 321 can be deployed to a vehicle body rear side and is disposed in front of the horn switch of the hub portion 311. The inflator 322 is disposed in front of the airbag body 321, and deploys the airbag body 321 toward a vehicle body rear side/toward a driver when a predetermined condition is satisfied (mainly, when an impact equal to or larger than a reference value is generated in the vehicle body).

Although details will be described later a space SP1 is formed between an attachment portion 39 for attaching the steering device 3 to the vehicle body and the inflator 322, that is, the space SP1 is formed in front of the inflator 322.

The in-vehicle component 33 is disposed so as to be adjacent to the airbag mechanism 32, and is disposed below the airbag mechanism 32 in the present embodiment. In the present embodiment, the in-vehicle component 33 is an electronic control unit (ECU) for deploying the airbag body 321, and outputs a signal to the inflator 322, for example, when an impact equal to or larger than a reference value is generated is the vehicle body. The inflator 322 deploys the airbag body 321 in response to the signal.

The in-vehicle component 33 may have other functions additionally/alternatively. In the present embodiment, the in-vehicle component 33 is connected to the sensor unit 91 by a wiring portion 92a, and can also acquire a detection result of the sensor unit 91.

Although not illustrated in FIG. 2, in a front view of the steering wheel 31, the wiring portion 92a is disposed so as to overlap the spoke portion 313 (here, the lower spoke portion 313U) such that the in-vehicle component 33 and the sensor unit 91 are connected to each other. As a result, the in-vehicle component 33 can appropriately acquire the detection result of the sensor unit 91.

Figure 4:
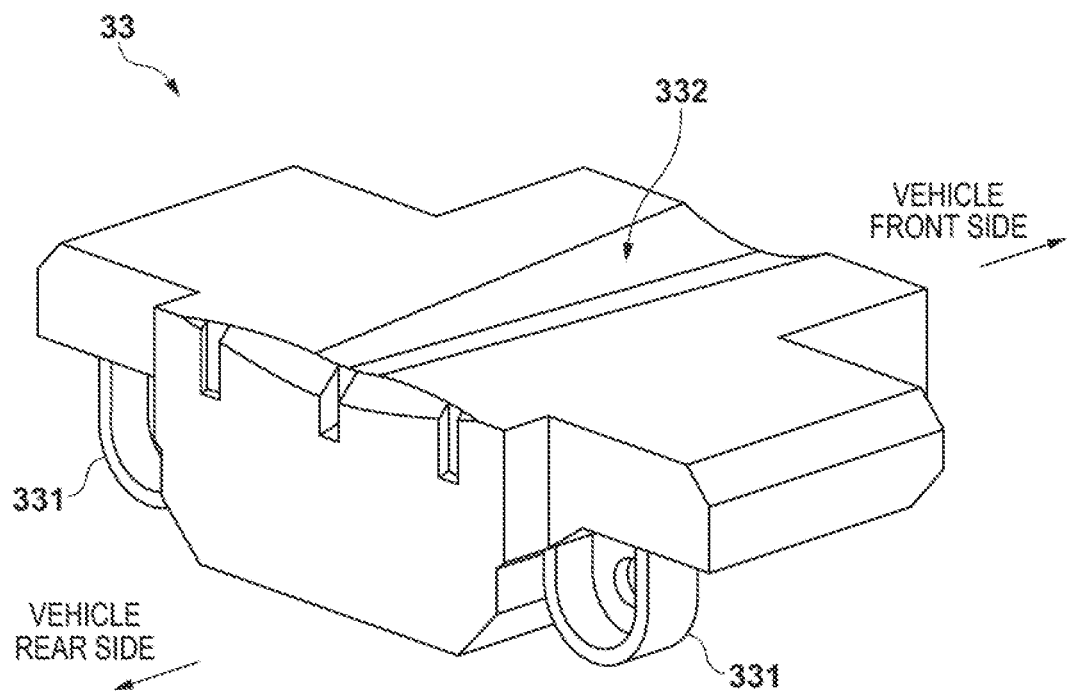
FIG. 4 is a schematic external view of an in-vehicle component.

FIG. 4 is a perspective view of the in-vehicle component 33. The in-vehicle component 33 is attached to a predetermined position in the steering wheel 31 by an attachment portion 331. The in-vehicle component 33 has a recessed groove portion 332 on a side of the airbag mechanism 32. The groove portion 332 is formed in the front-rear direction of the vehicle body. In the present embodiment, the groove portion 332 is formed so as to be wider and deeper from a vehicle body rear side toward a vehicle body front side.

Referring again to FIG. 3, the groove portion 332 is formed on an upper surface of the in-vehicle component 33 below the airbag body 321 to be deployed. The groove portion 332 is preferably formed along the rotating shaft of the steering wheel 31, and is preferably adjacent to the airbag body 321 to be deployed in a direction intersecting with the rotating shaft.

Figure 5:
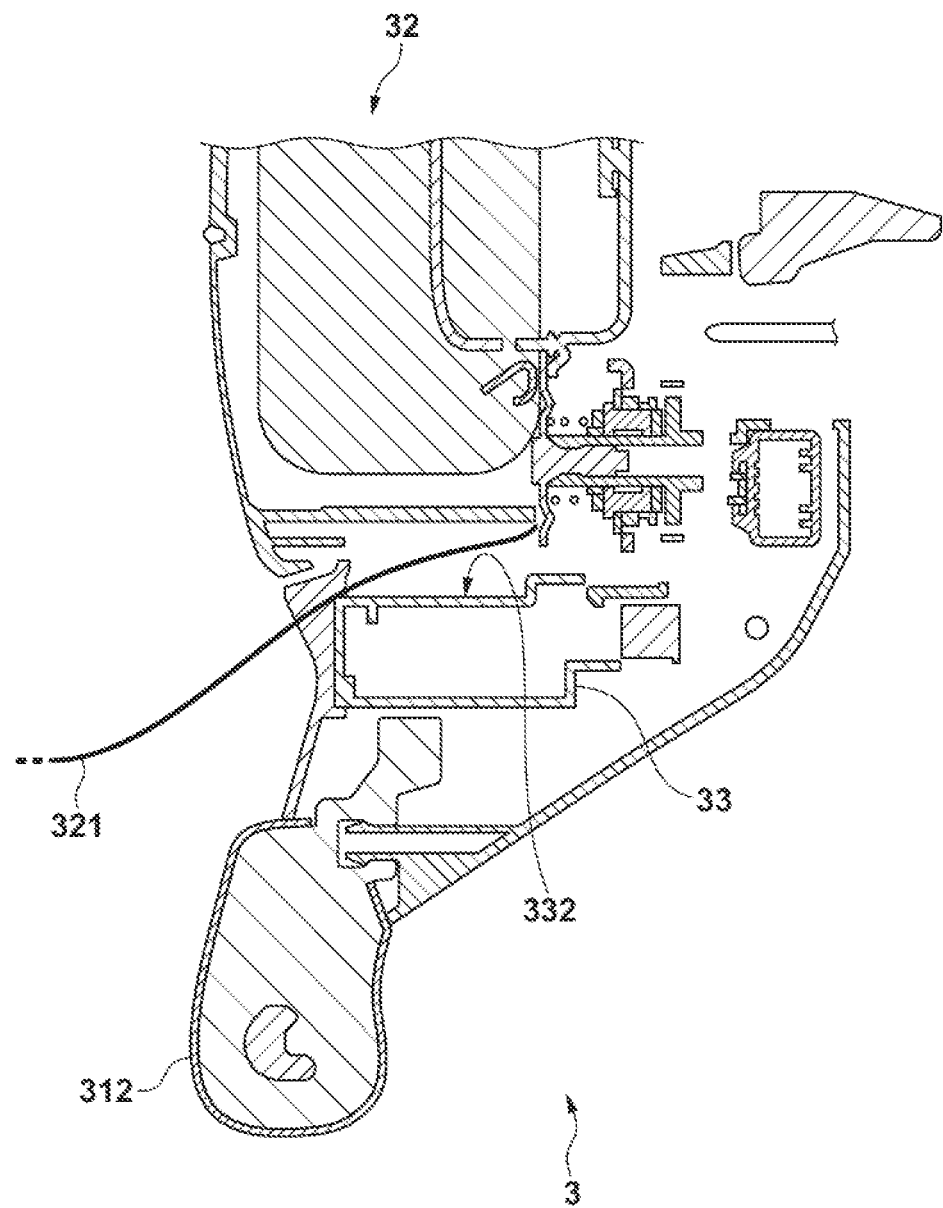
FIG. 5 is a schematic cross-sectional view illustrating a state where an airbag body is deployed.
Figure 6:
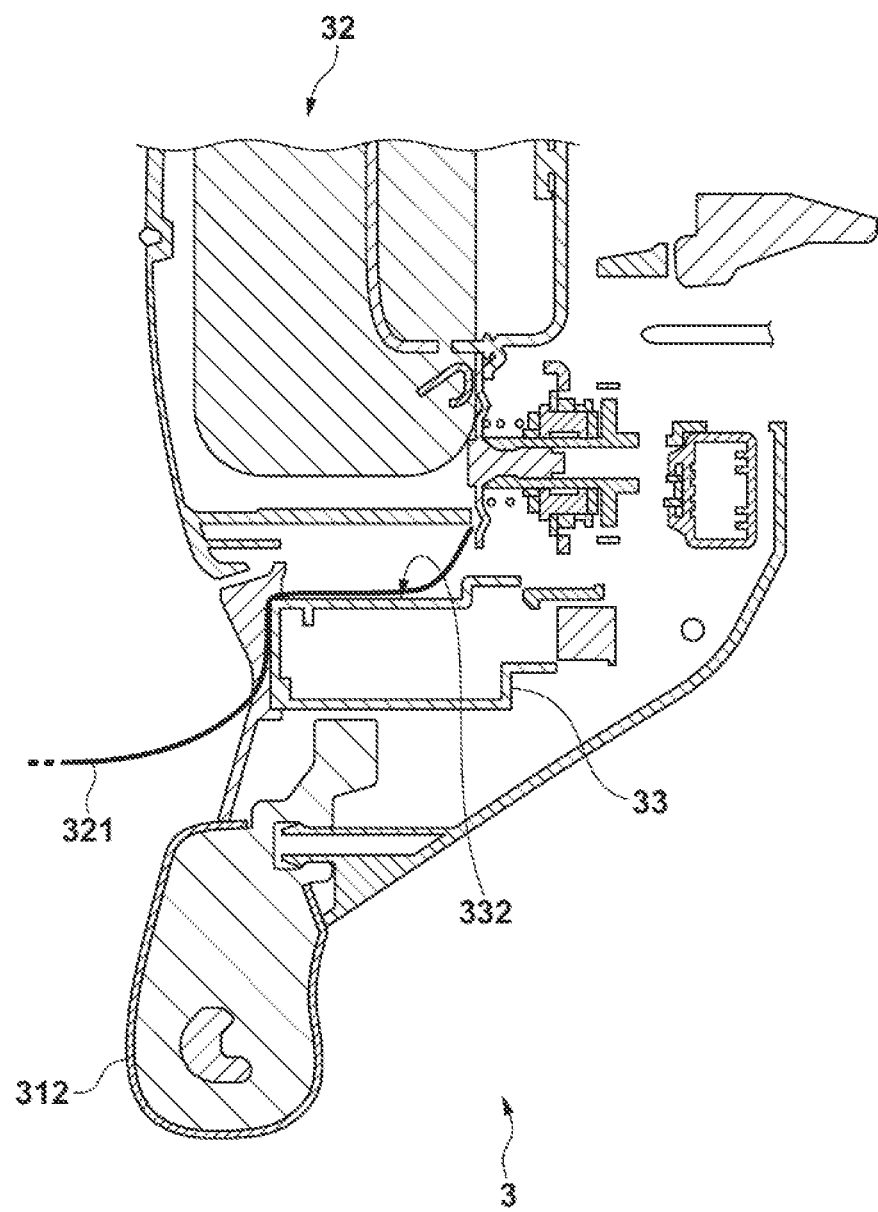
FIG. 6 is a schematic cross-sectional view illustrating a state where the airbag body is deployed.

FIGS. 5 and 6 are schematic cross-sectional views illustrating a state where the airbag body 321 is deployed. FIG. 5 illustrates a state of the airbag body 321 immediately after deployment. FIG. 6 illustrates a state where the deployed airbag body 321 absorbs an impact of a driver (or protects the driver from the impact), and is thereby deflected.

As illustrated in FIG. 5, when the inflator 322 deploys the airbag body 321, the deployment of the airbag body 321 is guided in the front-rear direction of the vehicle body by the groove portion 332. As a result, the airbag body 321 is appropriately deployed in front of the steering device 3 (steering wheel 31), and can absorb the impact of the driver regardless of a posture of the driver.

As illustrated in FIG. 6, the airbag body 321 absorbs the impact of the driver, and is then deflected toward a vehicle front side due to a reaction to the impact. At this time, the airbag body 321 can slide to a vehicle front side with respect to the in-vehicle component 33 by the groove portion 332.

As described above, in the present embodiment, the groove portion 332 is formed so as to be wider and deeper from a vehicle body rear side toward a vehicle body front side. According to such a structure, at the time of deployment (in the state illustrated in FIG. 5), a deployment direction of the airbag body 321 is appropriately regulated, and the airbag body 321 can appropriately absorb the impact of the driver regardless of a posture of the driver. Meanwhile, at the time of impact absorption (in the state illustrated in FIG. 6), a sliding direction of the airbag body 321 is appropriately regulated, and the airbag body 321 can release the above-described impact. This can be more appropriately implemented by forming the groove portions 332 so as to be symmetric laterally with respect to the airbag mechanism 32 (particularly, the center of the airbag body 321).

According to the present embodiment, the shape of the groove portion 332 only needs to be determined so as to reduce dynamic friction resistance between the airbag body 321 and the groove portion 332 at the time of deployment/impact absorption of the airbag body 321. In the present embodiment, the groove portion 332 satisfies both requirements of being wider and being deeper from a vehicle body rear side toward a vehicle body front side. However, as another embodiment, the groove portion 332 may be formed so as to satisfy one of the requirements.

In the present embodiment, in a front view of the steering wheel 31, the in-vehicle component 33 having the groove portion 332 is disposed so as to overlap the lower spoke portion 313U, but other elements may be disposed additionally/alternatively. For example, in addition to/in place of the in-vehicle component 33, a pair of left and right in-vehicle components may be disposed so as to overlap the left spoke portion 313L and the right spoke portion 313R, respectively. In this case, the pair of left and right in-vehicle components only needs to have a predetermined groove portion (corresponding to the groove portion 332) inside. At this time, the groove portion formed in the pair of left and right in-vehicle components preferably further extends in the horizontal direction than at least the rotating shaft of the steering wheel 31 in a side view.

As described with reference to FIG. 2, the switch case can be disposed on each of the left spoke portion 313L and the right spoke portion 313R. These switch cases can be utilized as the above-described pair of left and right in-vehicle components, and these switch cases preferably each have a predetermined groove portion (corresponding to the groove portion 332). Similarly to the groove portion 332, this groove is preferably formed so as to be wider and deeper from a vehicle body rear side toward a vehicle body front side, and more preferably formed such that a center line between an upper edge and a lower edge of the groove portion extends downward from a vehicle body rear side toward a vehicle body front side. As a result, at the time of impact absorption (in the state illustrated in FIG. 6), the impact can be released to the front side under the vehicle body, and the impact can be more appropriately absorbed.

In addition, according to the present embodiment, at the time of impact absorption (in the state illustrated in FIG. 6), the airbag body 321 can move to a vehicle body front side together with the inflator 322 when fixing of the airbag mechanism 32 is released/a fixing portion thereof is damaged. The space SP1 allows this movement, and the above-described impact can be thereby more appropriately released.

Referring again to FIG. 3, in addition to the wiring portion 92a, a wiring portion 92b is further connected to the in-vehicle component 33. As a result, the in-vehicle component 33 can communicate with another ECU (not illustrated) disposed in the vehicle body. According to the present embodiment, the wiring portion 92b can be disposed so as to pass through the space SP1.

According to the above embodiment, the in-vehicle component 33 built in the steering wheel 31 has the recessed groove portion 332 for guiding the airbag body 321 to be deployed when the airbag body 321 is deployed in the front-rear direction of the vehicle body. According to such a structure, the airbag body 321 can be appropriately and quickly deployed toward a vehicle body rear side, and can be appropriately deflected toward a vehicle body front side while sliding with respect to the in-vehicle component 33 when the airbag body 321 absorbs an impact of a driver.

In the above description, for ease of understanding, each element has been given a name related to its functional aspect. However, each element is not limited to one having, as a main function, the function described in the embodiment, and may be one having the function as an auxiliary auction. For example, although the vehicle 1 has been exemplified as a typical example in the present specification, the contents of the embodiment are also applicable to an object not including wheels (a ship and the like), that is, can be said to be applicable to various moving bodies.

The embodiment is summarized as follows:

A first aspect relates to a steering device (for example, the steering device 3). The steering device is an in-vehicle steering device including: a steering wheel (for example, the steering wheel 31) and an airbag mechanism (for example, the airbag mechanism 32) that is built in the steering wheel and includes an airbag body (for example, the airbag body 321) deployable to a vehicle body rear side, in which the steering device further includes an in-vehicle component (for example, the in-vehicle component 33) built in the steering wheel, and the in-vehicle component has a recessed groove portion (for example, the recessed groove portion 332) for guiding the airbag body to be deployed when the airbag body is deployed in a front-rear direction of the vehicle body.

As a result, the airbag body can be appropriately deployed, and is appropriately deflected when the airbag body absorbs an impact of a driver.

In a second aspect, the groove portion is formed along a rotating shaft of the steering wheel, and is formed so as to be adjacent to the airbag body to be deployed in a direction intersecting with the rotating shaft.

As a result, the first aspect is appropriately achieved.

In a third aspect, in a posture of the steering wheel that allows a vehicle (for example, the vehicle 1) to travel straight, the groove portion is formed below the airbag body to be deployed.

As a result, the first aspect is appropriately achieved.

In a fourth aspect, the airbag mechanism further includes an inflator (for example, the inflator 322) for deploying the airbag body, and there is a space (for example, the space SP1) in a vehicle body front side of the inflator.

As a result, when the airbag body absorbs an impact of a driver, the impact can be appropriately released to a vehicle body front side.

In a fifth aspect, the in-vehicle component is an electronic control unit (for example, the electronic control unit 33) for deploying the airbag body, and a wiring portion (for example, the wiring portion 92b) connected to the electronic control unit is disposed so as to pass through the space.

That is, the space is utilized for disposing the wiring portion.

In a sixth aspect, the steering wheel includes a hub portion (for example, the hub portion 311), a rim portion (for example, the rim portion 312), and a spoke portion (for example, the spoke portion 313) connecting the hub portion and the rim portion to each other, and in a front view of the steering wheel, the airbag mechanism is disposed so as to overlap the hub portion, and the electronic control unit is disposed so as to overlap the spoke portion.

As a result, the first aspect is achieved with a relatively simple configuration.

In a seventh aspect, the steering device further includes a sensor unit (for example, the sensor unit 91) that is built in the steering wheel and can detect grip of the rim portion by a driver, and in a front view of the steering wheel, the wiring portion is disposed so as to overlap the spoke portion such that the electronic control unit and the sensor unit are connected to each other.

As a result, the first aspect is achieved with a relatively simple configuration.

In an eighth aspect, the groove portion is framed so as to be wider from a vehicle body rear side toward a vehicle body front side.

As a result, the first aspect is more appropriately achieved.

In a ninth aspect, the groove portion is formed so as to be deeper from a vehicle body rear side toward a vehicle body front side.

As a result, the first aspect is more appropriately achieved.

In a tenth aspect, the groove portion is formed so as to be symmetric laterally with respect to the airbag mechanism.

As a result, the first aspect is more appropriately achieved.

An eleventh aspect relates to a vehicle (for example, the vehicle 1), in which the vehicle includes the above-described steering device (for example, the steering device 3) and wheels (for example, the wheels 2).

That is, the above-described steering device is applicable to a typical vehicle.

The invention is not limited to the foregoing embodiments, and various variations/changes are possible within the spirit of the invention.

What is claimed is:

1. An in-vehicle steering device comprising:
   a steering wheel; and
   an airbag mechanism that is built in the steering wheel and includes an airbag body deployable to a vehicle body rear side, wherein
   the steering device further comprises an in-vehicle component built in the steering wheel, and the in-vehicle component has a recessed groove portion for guiding the airbag body to be deployed when the airbag body is deployed in a front-rear direction of the vehicle body.

2. The steering device according to claim 1, wherein
   in a posture of the steering wheel that allows a vehicle to travel straight, the groove portion is formed below the airbag body to be deployed.

3. The steering device according to claim 1, wherein
   the airbag mechanism further includes an inflator for deploying the airbag body, and there is a space in a vehicle body front side of the inflator.

4. The steering device according to claim 3, wherein
   the in-vehicle component is an electronic control unit for deploying the airbag body, and
   a wiring portion connected to the electronic control unit is disposed so as to pass through the space.

5. The steering device according to claim 4, wherein
   the steering wheel includes a hub portion, a rim portion, and a spoke portion connecting the hub portion and the rim portion to each other, and
   in a front view of the steering wheel, the airbag mechanism is disposed so as to overlap the hub portion, and the electronic control unit is disposed so as to overlap the spoke portion.

6. The steering device according to claim 5, further comprising
- a sensor unit that is built in the steering wheel and can detect grip of the rim portion by a driver, wherein
- in a front view of the steering wheel, the wiring portion is disposed so as to overlap the spoke portion such that the electronic control unit and the sensor unit are connected to each other.

7. The steering device according to claim 1, wherein
- the groove portion is formed so as to be wider from a vehicle body rear side toward a vehicle body front side.

8. The steering device according to claim 1, wherein
- the groove portion is formed so as to be deeper from a vehicle body rear side toward a vehicle body front side.

9. The steering device according to claim 1, wherein
- the groove portion is formed so as to be symmetric laterally with respect to the airbag mechanism.

10. A vehicle comprising:
- the sleeting device according to claim 1; and wheels.

* * * * *